US010760168B2

(12) United States Patent
Kandapallil et al.

(10) Patent No.: US 10,760,168 B2
(45) Date of Patent: Sep. 1, 2020

(54) COMPOSITE NANOPARTICLES COMPRISING A COMPLEXING LIGAND AND METHODS OF PREPARATION THEREOF

(71) Applicant: GENERAL ELECTRIC COMPANY, Schenectady, NY (US)

(72) Inventors: Binil Itty Ipe Kandapallil, Mechanicville, NY (US); Lakshmi Krishnan, Clifton Park, NY (US); Francis Johnson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 15/950,133

(22) Filed: Apr. 10, 2018

(65) Prior Publication Data

US 2018/0230607 A1 Aug. 16, 2018

Related U.S. Application Data

(62) Division of application No. 14/715,704, filed on May 19, 2015, now Pat. No. 9,938,628.

(51) Int. Cl.

| | |
|---|---|
| ***B32B 5/16*** | (2006.01) |
| ***C25B 3/00*** | (2006.01) |
| ***C25D 3/56*** | (2006.01) |
| ***C25D 15/00*** | (2006.01) |
| ***C25D 11/34*** | (2006.01) |
| ***C25C 5/02*** | (2006.01) |
| ***C25C 7/06*** | (2006.01) |
| ***C25B 3/12*** | (2006.01) |
| ***H01F 1/00*** | (2006.01) |

(52) U.S. Cl.
CPC .................. *C25B 3/00* (2013.01); *C25B 3/12* (2013.01); *C25C 5/02* (2013.01); *C25C 7/06* (2013.01); *C25D 3/56* (2013.01); *C25D 11/34* (2013.01); *C25D 15/00* (2013.01); *H01F 1/0054* (2013.01)

(58) Field of Classification Search
CPC ........................................................ C07F 1/08
See application file for complete search history.

(56) References Cited

U.S. PATENT DOCUMENTS

2017/0044188 A1* 2/2017 Yoshino .................... C07F 1/08

OTHER PUBLICATIONS

Heuer-Jungemann et al., The Role of Ligands in the Chemical Synthesis and Applications of Inorganic Nanoparticles, Chem. Rev. 2019, 119, 8, 4819-4880 (Year: 2019).*

Al-Hokbany, Mahfourz, Preparation and characterization of new Sm(III) complexes with some bidentate ligands contains (N,N), (S,N), (O,O) and (N,O) donor atoms, J. of Saudi Chemical Society, vol. 14, Issue 4, Oct. 2010, pp. 391-398 (Year: 2010).*

Tsymbarenko, Mixed Ligand Acetate, Propionate, and Pivalate Complexes of Rare Earth Metals with Monoethanolamine: A New Approach to the Synthesis, Composition, Structure, and Use for the Preparation of Oxide Materials, Russian Journal of Coordination Chemistry vol. 42 No. 10 2016 (Year: 2016).*

* cited by examiner

*Primary Examiner* — Hoa (Holly) Le
(74) *Attorney, Agent, or Firm* — Armstrong Teasdale LLP

(57) ABSTRACT

The present invention is directed to composite nanoparticles comprising a metal, a rare earth element, and, optionally, a complexing ligand. The invention is also directed to composite nanoparticles having a core-shell structure and to processes for preparation of composite nanoparticles of the invention.

9 Claims, 2 Drawing Sheets

COMPOSITE NANOPARTICLES COMPRISING A COMPLEXING LIGAND AND METHODS OF PREPARATION THEREOF

STATEMENT ON FEDERALLY SPONSORED RESEARCH OR DEVELOPMENT

This invention was made with government support under contract number DE-AC02-07CH11358 awarded by the U.S. Department of Energy, Critical Materials Institute at Ames Laboratory. The government has certain rights in the invention.

FIELD OF THE INVENTION

This invention relates to composite nanoparticles and methods of preparation thereof. The composite nanoparticles of the invention are useful for preparation of hard magnetic phase materials.

BACKGROUND OF THE INVENTION

Magnetic nanoparticles have potential applications in a variety of next-generation nanotechnology devices, such as high-density magnetic recording media, nanoscale electronics, radio-frequency electromagnetic wave shields, nanocomposite permanent magnets or transformer cores. In the biomedical field, magnetic nanoparticles have potential applications as biomolecule labeling agents or as contrast agents for magnetic resonance imaging (MRI). Nanocomposite permanent magnets having hard magnetic phase nanoparticles and soft magnetic phase nanoparticles may significantly enhance the intrinsic coercivity of permanent magnets, or at least retain desirable energy product values using less quantities of the hard magnetic phase. Accordingly, a reliable supply of hard phase magnetic nanoparticles with desirable size and magnetic properties is required to produce nanocomposite permanent magnets.

In order to fabricate a nanocomposite permanent magnet, it is essential to understand the structure-property relationship of hard phase nanoparticles, which has been severely impeded by the inability to synthesize sub-10 nm sized nanoparticles. Optimization of grain boundaries to achieve spring coupling between soft and hard phase magnetic materials requires the ability to systematically tune nanoparticle size.

SUMMARY OF THE INVENTION

The present invention relates to composite nanoparticles and to methods of preparation of composite nanoparticles. For example, we successfully demonstrated electrochemical synthesis of $SmCo_5$ composite nanoparticles, which could be utilized for the synthesis of magnetic $SmCo_5$ nanoparticles using a heat treatment process.

The present invention enables a modular electrochemical process whereby fabrication of composite nanoparticles with any desirable stoichiometry is possible by adjusting process parameters, such as current and voltage. For example, samarium and cobalt (SmCo) composite nanoparticles may be prepared using the processes of the invention, wherein SmCo composite nanoparticles have any desirable stereochemistry, such as, for example, $SmCo_5$, $Sm_2Co_7$, $Sm_2Co_{17}$, and $Sm_5Co_{19}$.

In one embodiment, the invention is directed to a composite nanoparticle comprising a metal, a rare earth element, and a complexing ligand.

The complexing ligand possesses a property of adhering to the metal and to the rare earth element, thus complexing the metal with the rare earth element. In one embodiment, the complexing ligand is a compound of formula (I):

(I)

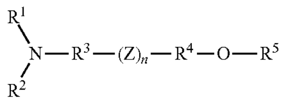

wherein $R^1$ is H, alkyl, arylalkyl, or aryl;

$R^2$ is H, alkyl, arylalkyl, or aryl;

$R^3$ is alkylene, -alkylene-arylene-, arylene, or alkylene substituted with alkyl or aryl;

$R^4$ is alkylene, -alkylene-arylene-, arylene, or alkylene substituted with alkyl or aryl;

$R^5$ is H, alkyl, arylalkyl, or aryl;

Z is —O—, —S—, —N(H)—, or —N($R^6$)—, wherein $R^6$ is alkyl; and n is 0 or 1.

In another embodiment, the invention relates to a composite nanoparticle having a core-shell structure. Such composite nanoparticle comprises a core nanoparticle and a shell layer encapsulating or substantially encapsulating the core nanoparticle; the core nanoparticle is a metal or a rare earth element; the shell layer is a metal or a rare earth element; wherein, when the core nanoparticle is the metal, the shell layer is the rare earth element; and wherein, when the core nanoparticle is the rare earth element, the shell layer is the metal.

In one embodiment, the composite nanoparticles having a core-shell structure further comprise a complexing ligand layer located between the core nanoparticle and the shell layer, wherein the complexing ligand layer comprises the complexing ligand of formula (I).

The present invention is also directed to processes of preparation of composite nanoparticles. In one embodiment, the invention is directed to a process for preparation of composite nanoparticles in an electrochemical cell comprising a first sacrificial anode, a second sacrificial anode, a cathode, and a reaction solution, the process comprising:

(a) applying an electric current to the first sacrificial anode and to the cathode, wherein the first sacrificial anode is a metal anode or a rare earth element anode;

(b) applying an electric current to the second sacrificial anode and to the cathode, wherein the second sacrificial anode is a metal anode or a rare earth element anode;

provided that when the first sacrificial anode is the metal anode, the second sacrificial anode is the rare earth element anode; and provided that when the first sacrificial anode is the rare earth element anode, the second sacrificial anode is the metal anode;

wherein the reaction solution comprises an organic solvent, an electrolyte, and a complexing ligand;

whereby composite nanoparticles are formed in the reaction solution.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
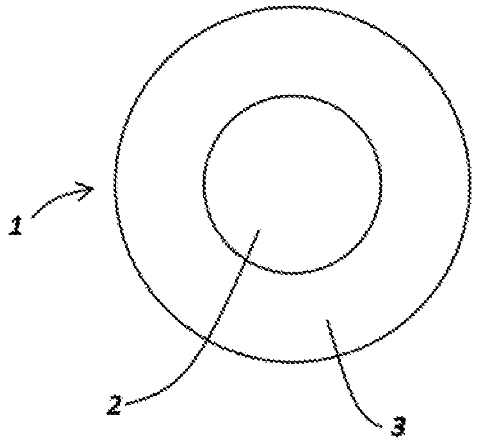
FIG. 1 is an idealized cross-sectional view of a composite nanoparticle comprising a core nanoparticle and a shell layer, in accordance with one embodiment of the present invention.

In the following specification and the claims which follow, reference will be made to a number of terms, which shall be defined to have the following meanings.

The singular forms “a”, “an”, and “the” include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “about”, is not to be limited to the precise value specified. In some instances, the approximating language may correspond to the precision of an instrument for measuring the value.

As used herein, the term “solvent” can refer to a single solvent or a mixture of solvents.

As used herein, the term “metal” refers to a transition metal or a post-transition metal. Examples of metal are iron, cobalt, nickel, manganese, platinum, aluminum, copper, zirconium, and chromium.

As used herein, the term “rare earth element” refers to lanthanides, scandium, and yttrium. Examples of rare earth elements are samarium, praseodymium, neodymium, gadolinium, yttrium, dysprosium, terbium, and scandium.

As used herein, the transition phrase “consisting essentially of” has its ordinary meaning of signaling that the invention necessarily includes the listed ingredients and is open to unlisted ingredients that do not materially affect the basic and novel properties of the invention. Such unlisted ingredients may be, for example, carbon, hydrogen, oxygen, and nitrogen.

As used herein, the term “sacrificial anode” has a meaning of an electrode through which electric current flows into reaction solution in an electrochemical cell, wherein the sacrificial anode releases ions by oxidative dissolution.

As used herein, the term “cathode” has a meaning of an electrode from which electric current leaves reaction solution of an electrochemical cell. Within the scope of the processes of the invention, the cathode may be made from any suitable material, such as, for example, platinum, cobalt, or glassy carbon. It should be understood that the embodiments of the present invention may utilize a single cathode or multiple cathodes, for example, two cathodes. Therefore, the term “the cathode” refers to a single cathode or to two or more cathodes. A person having ordinary skill in the art would have sufficient understanding of the relevant chemical and physical principles involved in the processes of the invention and, therefore, would be able to determine without undue experimentation whether a single cathode or multiple cathodes may be used. Similarly, a person having ordinary skill in the art would be able to select without undue experimentation desirable properties of one or more cathodes, for example, their elemental composition and size.

Unless otherwise specified, “alkyl” is intended to include linear, branched, or cyclic hydrocarbon structures and combinations thereof. A combination would be, for example, cyclopropylmethyl. As used herein, the term “alkyl” encompasses lower alkyls, which are alkyl groups of from 1 to 6 carbon atoms. Examples of lower alkyl groups include methyl, ethyl, propyl, isopropyl, butyl, s- and t-butyl and the like. As used herein, the term “alkyl” also encompasses alkyls having from 1 to 18 carbon atoms. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

The term “aryl” includes heteroaryls and has the meaning of: (i) a phenyl group (or benzene) or a monocyclic 5- or 6-membered heteroaromatic ring containing 1-4 heteroatoms selected from O, N, or S; (ii) a bicyclic 9- or 10-membered aromatic or heteroaromatic ring system containing 0-4 heteroatoms selected from O, N, or S; and (iii) a tricyclic 13- or 14-membered aromatic or heteroaromatic ring system containing 0-5 heteroatoms selected from O, N, or S. The aromatic 6- to 14-membered carbocyclic rings include, e.g., benzene, naphthalene, indane, tetralin, and fluorene and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole. As used herein, aryl encompass multi ring structures in which one or more rings are aromatic, but it is not necessary for all rings to be aromatic.

As used herein, the term “arylalkyl” refers to a substituent in which an aryl residue is attached to the parent structure through alkyl. Examples are benzyl, phenethyl and the like. As used herein, the term arylalkyl includes heteroarylalkyl, which is a substituent in which a heteroaryl residue is attached to the parent structure through alkyl. In one embodiment, the alkyl group of an arylalkyl or a heteroarylalkyl is an alkyl group of from 1 to 18 carbons. Examples include, e.g., pyridinylmethyl, pyrimidinylethyl and the like.

As used herein, the term “alkylaryl” refers to a substituent in which an alkyl residue is attached to the parent structure through aryl. As used herein, the term alkylaryl includes alkylheteroaryl, which is a substituent in which an alkyl residue is attached to the parent structure through a heteroaryl.

As used herein, the term “alkylene” refers to a bivalent alkane. Alkylene links two groups, for example as R-alkylene-R, wherein R is any group. Structurally, alkylene encompasses the same structures as those described above for alkyl.

As used herein, the term "-alkylene-arylene-" refers to alkylaryl or arylalkyl that links two moieties and could have either "-alkylene-arylene-" or "-arylene-alkylene-orientation, for example, as in R-alkylene-arylene-R or as in R-arylene-alkylene-R, wherein R is any group. Structurally, -alkylene-arylene- encompasses the same structures as those described above for arylalkyl and alkylaryl.

As used herein, the term "arylene" refers to a bivalent aryl. Arylene links two groups, for example, as in R-arylene-R, wherein R is any group. Structurally, arylene encompasses the same structures as those described above for aryl.

The invention relates to composite nanoparticles comprising a metal and a rare earth element. In one embodiment, the invention is directed to a composite nanoparticle comprising a metal, a rare earth element, and a complexing ligand. In one preferred embodiment, the metal is cobalt and the rare earth element is samarium.

In another embodiment, the invention relates to a composite nanoparticle having a core-shell structure. One embodiment of a composite nanoparticle having the core-shell structure is shown in FIG. 1. In this embodiment, the invention is directed to a composite nanoparticle 1 comprising a core nanoparticle 2 and a shell layer 3 encapsulating or substantially encapsulating the core nanoparticle 2; the core nanoparticle 2 comprising a metal or a rare earth element; the shell layer 3 comprising a metal or a rare earth element; wherein, when the core nanoparticle 2 comprises the metal, the shell layer 3 comprises the rare earth element; and wherein, when the core nanoparticle 2 comprises the rare earth element, the shell layer 3 comprises the metal.

In another embodiment, the invention is directed to a composite nanoparticle 1 comprising a core nanoparticle 2 and a shell layer 3 encapsulating or substantially encapsulating the core nanoparticle 2; the core nanoparticle 2 consisting essentially of a metal or a rare earth element; the shell layer 3 consisting essentially of a metal or a rare earth element; wherein, when the core nanoparticle 2 consists essentially of the metal, the shell layer 3 consists essentially of the rare earth element; and wherein, when the core nanoparticle 2 consists essentially of the rare earth element, the shell layer 3 consists essentially of the metal.

In another embodiment, the invention is directed to a composite nanoparticle 1 comprising a core nanoparticle 2 and a shell layer 3 encapsulating or substantially encapsulating the core nanoparticle 2; the core nanoparticle 2 consisting of a metal or a rare earth element; the shell layer 3 consisting of a metal or a rare earth element; wherein, when the core nanoparticle 2 consists of the metal, the shell layer 3 consists of the rare earth element; and wherein, when the core nanoparticle 2 consists of the rare earth element, the shell layer 3 consists of the metal.

Figure 2:
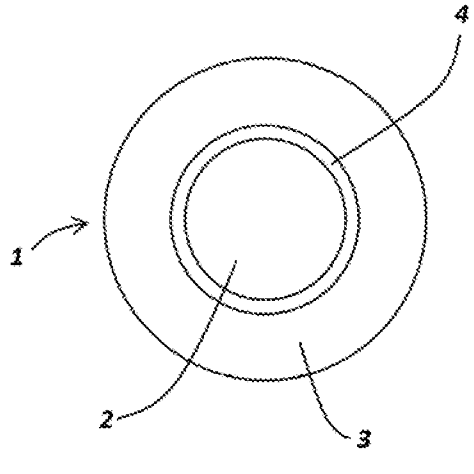
FIG. 2 is an idealized cross-sectional view of a composite nanoparticle comprising a core nanoparticle, a complexing ligand layer, and a shell layer, in accordance with one embodiment of the present invention.

In one embodiment shown in FIG. 2, the composite nanoparticles having a core-shell structure may further comprise a complexing ligand layer 4 located between the core nanoparticle 2 and the shell layer 3, the complexing ligand layer 4 comprising a complexing ligand.

In the above described embodiments of composite nanoparticles, the metal may be a transition metal or a post-transition metal. Preferred metals of the invention are selected from the group consisting of iron, cobalt, nickel, manganese, platinum, aluminum, copper, zirconium, and chromium. One preferred metal is cobalt.

In the above described embodiments of composite nanoparticles, the rare earth elements include lanthanides, scandium, and yttrium. Preferred rare earth elements of the invention are selected from the group consisting of samarium, praseodymium, neodymium, gadolinium, yttrium, dysprosium, and terbium. One preferred rare earth element is samarium.

Composite nanoparticles with various stoichiometric ratios of rare earth element to metal are within the scope of the invention. Some exemplary stoichiometric ratios of rare earth element to metal are selected from the group consisting of 1:1, 1:3, 1:5, 1:7, 1:13, 2:7, 2:17, and 5:19.

In one embodiment, the complexing ligand is a compound of formula (I):

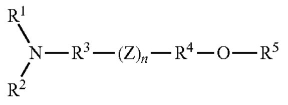

(I)

wherein $R^1$ is H, alkyl, arylalkyl, or aryl;

$R^2$ is H, alkyl, arylalkyl, or aryl;

$R^3$ is alkylene, -alkylene-arylene-, arylene, or alkylene substituted with alkyl or aryl;

$R^4$ is alkylene, -alkylene-arylene-, arylene, or alkylene substituted with alkyl or aryl;

$R^5$ is H, alkyl, arylalkyl, or aryl;

Z is —O—, —S—, —N(H)—, or —N($R^6$)—, wherein $R^6$ is alkyl; and n is 0 or 1.

In some preferred embodiments, the complexing ligand is selected from the group consisting of 2-[2-(dimethylamino)ethoxy]ethanol, 2-[2-(diethylamino)ethoxy]ethanol, 2-{[2-(dimethylamino)ethyl]methylamino}ethanol, 4-(dimethylamino)-1-butanol, and mixtures thereof. In one preferred embodiment, the complexing ligand is 2-[2-(dimethylamino)ethoxy]ethanol, 2-[2-(diethylamino)ethoxy]ethanol.

The composite nanoparticles may have a mean diameter size from about 2 nm to about 500 nm. In one preferred embodiment, the composite nanoparticles may have a mean diameter size from about 2 nm to about 20 nm. In another preferred embodiment, the composite nanoparticles may have a mean diameter size from about 2 nm to about 5 nm, from about 2 nm to about 10 nm, or from about 2 nm to about 15 nm. The mean diameter of the particles is measured by using Transmission Electron Microscope (TEM).

The composite nanoparticles of the invention may have various shapes with an aspect ratio from 1 to 1000.

The invention is also directed to various processes for preparation of the above described composite nanoparticles. In one embodiment, the invention is directed to a process for preparation of composite nanoparticles in an electrochemical cell comprising a first sacrificial anode, a second sacrificial anode, a cathode, and a reaction solution, the process comprising:

(a) applying an electric current to the first sacrificial anode and to the cathode, wherein the first sacrificial anode is a metal anode or a rare earth element anode;

(b) applying an electric current to the second sacrificial anode and to the cathode, wherein the second sacrificial anode is a metal anode or a rare earth element anode;

provided that when the first sacrificial anode is the metal anode, the second sacrificial anode is the rare earth element anode; and provided that when the first sacrificial anode is the rare earth element anode, the second sacrificial anode is the metal anode;

wherein the reaction solution comprises an organic solvent, an electrolyte, and a complexing ligand;

whereby composite nanoparticles are formed in the reaction solution.

In one embodiment, the process further comprises collecting the composite nanoparticles from the reaction solution. The process may then further comprise performing heat treatment of the composite nanoparticles.

In one embodiment of the above describe process, step (b) is performed subsequently to step (a). In another embodiment of the above process, step (a) and step (b) are performed concurrently. The term "concurrently" encompasses a process in which steps (a) and (b) start at the same time and end at the same time. The term "concurrently" also encompasses processes in which steps (a) and (b) overlap in time. An example of such overlap in time would be when steps (a) and (b) start at same or different points in time and end at same or different points in time, wherein for some portion of the time steps (a) and (b) are performed simultaneously.

In one embodiment, the metal anode is a transition metal anode or a post-transition metal anode. In preferred embodiments, the metal anode is selected from the group consisting of iron, cobalt, nickel, manganese, platinum, aluminum, copper, zirconium, and chromium anodes. One preferred metal anode is a cobalt anode.

In one embodiment, the rare earth element anode is selected from lanthanide, scandium, and yttrium anodes. In preferred embodiments, the rare earth element anode is selected from the group consisting of samarium, praseodymium, neodymium, gadolinium, yttrium, dysprosium, and terbium anodes. One preferred rare earth element anode is a samarium anode.

In one embodiment of the invention, the first sacrificial anode is a metal anode and the second sacrificial anode is a rare earth element anode. In one preferred embodiment of the invention, the first sacrificial anode is a cobalt anode and the second sacrificial anode is a samarium anode.

In another preferred embodiment of the invention, the first sacrificial anode is a rare earth element anode and the second sacrificial anode is a metal anode. In one preferred embodiment of the invention, the first sacrificial anode is a samarium anode and the second sacrificial anode is a cobalt anode.

In one embodiment of the invention, the organic solvent is an organic polar aprotic solvent. In preferred embodiments, the organic solvent is selected from the group consisting of tetrahydrofuran, acetone, acetonitrile, dimethylformamide, dimethyl sulfoxide, and mixtures thereof. In one preferred embodiment of the invention, the organic solvent is tetrahydrofuran.

The present invention is also directed to a process for preparation of composite nanoparticles in an electrochemical cell comprising a first sacrificial anode, a cathode, and a reaction solution comprising an organic solvent, an electrolyte, and a complexing ligand, the process comprising:

(a) applying an electric current to the first sacrificial anode and to the cathode, wherein the first sacrificial anode is a metal anode or a rare earth element anode, whereby core nanoparticles are formed in the reaction solution;

(b) stopping applying the electric current to the first sacrificial anode and to the cathode in step (a);

(c) simultaneously with or subsequently to step (b), applying an electric current to a second sacrificial anode and to the cathode, wherein the first sacrificial anode is replaced with the second sacrificial anode in the electrochemical cell or wherein the second sacrificial anode is added to the electrochemical cell or wherein the electrochemical cell comprises both the first sacrificial anode and the second sacrificial anode prior to step (a), wherein the second sacrificial anode is a metal anode or a rare earth element anode;

provided that when the first sacrificial anode is the metal anode, the second sacrificial anode is the rare earth element anode; and provided that when the first sacrificial anode is the rare earth element anode, the second sacrificial anode is the metal anode;

whereby composite nanoparticles are formed in the electrolyte solution.

In one embodiment, the process further comprises collecting the composite nanoparticles from the reaction solution. The process may then further comprise performing heat treatment of the composite nanoparticles.

Figure 3:
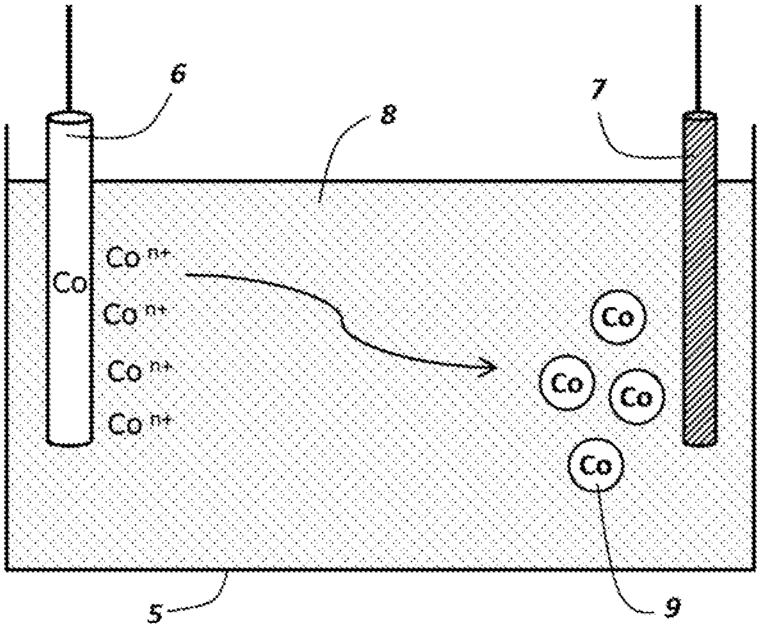
FIG. 3 is a diagrammatic cross-sectional view of an electrochemical cell comprising a first sacrificial anode, which in the depicted embodiment is a cobalt anode, a cathode, and a reaction solution, wherein, in a step of one process of the present invention, an electric current is applied to the cobalt anode and to the cathode, whereby core nanoparticles, shown in an idealized cross-sectional view, are formed in the reaction solution.
Figure 4:
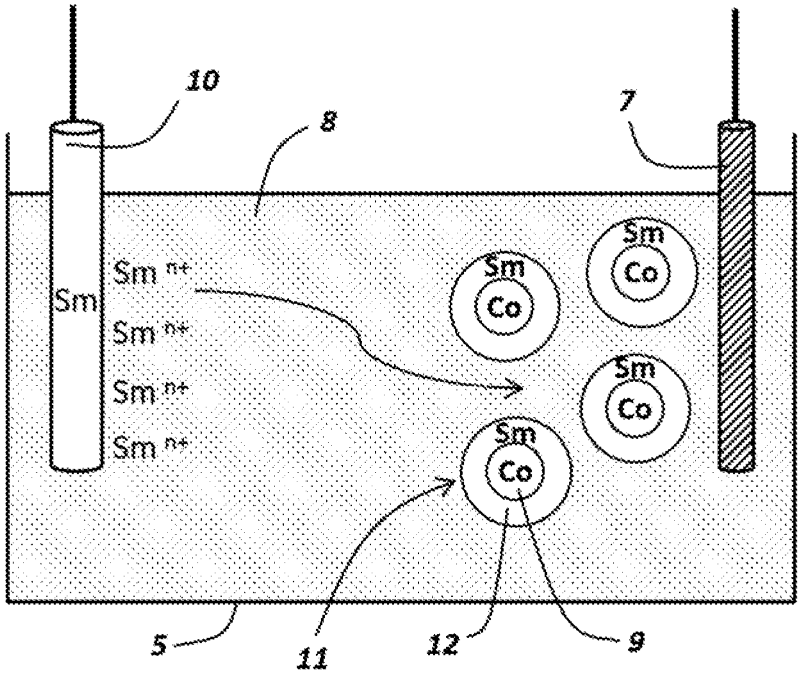
FIG. 4 is a diagrammatic cross-sectional view of an electrochemical cell comprising a second sacrificial anode, which in the depicted embodiment is a samarium anode, a cathode, and a reaction solution, wherein, in a step of one process of the present invention, an electric current is applied to the samarium anode and to the cathode, whereby composite nanoparticles, shown in an idealized cross-sectional view, are formed in the reaction solution.

One embodiment of the above described process is depicted in FIGS. 3 and 4. In this embodiment, the present invention is directed to a process for preparation of samarium cobalt composite nanoparticles in an electrochemical cell 5 comprising a first sacrificial anode, which is a cobalt anode 6 in this embodiment, a cathode 7, and a reaction solution 8 comprising an organic solvent, an electrolyte, and a complexing ligand, the process comprising:

(a) applying an electric current to the cobalt anode 6 and to the cathode 7, whereby cobalt core nanoparticles 9 are formed in the reaction solution 8;

(b) stopping applying the electric current to the cobalt anode 6 and to the cathode 7 in step (a);

(c) simultaneously with or subsequently to step (b), applying an electric current to a second sacrificial anode, which is a samarium anode 10 in this embodiment, and to the cathode 7, wherein the cobalt anode 6 is replaced with the samarium anode 10 in the electrochemical cell 5 or wherein the samarium anode 10 is added to the electrochemical cell 5 or wherein the electrochemical cell comprises both the cobalt anode 6 and the samarium anode 10 prior to step (a);

whereby samarium cobalt composite nanoparticles 11 are formed in the electrolyte solution.

In the above described process, the samarium cobalt composite nanoparticles 11 have a cobalt core nanoparticle 9 and a samarium shell layer 12. The samarium cobalt composite nanoparticles 11 may further comprise a complexing ligand layer located between the cobalt core nanoparticle 9 and the samarium shell layer 12.

To prepare samarium cobalt composite nanoparticles having a samarium core nanoparticle and a cobalt shell layer, the order of use of the cobalt and samarium anodes would be reversed. The samarium anode would be the first sacrificial anode utilized in step (a) and the cobalt anode would be the second sacrificial anode utilized in step (c).

The invention is also directed to a process for preparation of composite nanoparticles in an electrochemical cell comprising a first sacrificial anode (for example, a metal anode), a second sacrificial anode (for example, a rare earth element anode), a cathode, and reaction solution comprising an organic solvent, an electrolyte, and a complexing ligand, the process comprising applying an electric current to the first sacrificial anode, to the second sacrificial anode, and to the cathode, whereby composite nanoparticles are formed in the reaction solution. In one embodiment, the process further comprises collecting the composite nanoparticles from the reaction solution. The process may then further comprise performing heat treatment of the composite nanoparticles.

In one embodiment, the complexing ligand of the processes of the invention has the above described structure of formula (I). In preferred embodiments of the invention, the complexing ligand is selected from the group consisting of 2-[2-(dimethylamino)ethoxy]ethanol, 2-[2-(diethylamino) ethoxy]ethanol, 2-{[2-(dimethylamino)ethyl] methylamino}ethanol, 4-(dimethylamino)-1-butanol, and mixtures thereof. In one preferred embodiment, the complexing ligand is 2-[2-(dimethylamino)ethoxy]ethanol.

The concentration of the complexing ligand in the reaction solution may vary from about 0.05 M to about 50 M.

The electrolyte used in the above described processes may be a quaternary ammonium salt or a quaternary phosphonium salt. In some embodiments, the electrolyte is a compound of formula (II):

(II)

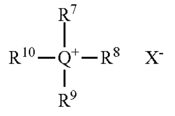

wherein $R^7$ is alkyl, arylalkyl, or aryl;

$R^8$ is alkyl, arylalkyl, or aryl;

$R^9$ is alkyl, arylalkyl, or aryl;

$R^{10}$ is alkyl, arylalkyl, or aryl;

$Q^+$ is $N^+$ or $P^+$; and $X^-$ is chloride ion, bromide ion, iodide ion, hexafluorophosphate, carboxylate ion, or sulfonate ion.

In preferred embodiments, the electrolyte is selected from the group consisting of tetraoctylammonium bromide, triethylbenzylammonium chloride, tetrahexylammonium chloride, and mixtures thereof.

The concentration of the electrolyte in the reaction solution may vary from about 0.01 M to about 10 M.

The temperature of the reaction solution may vary from about −100° C. to about 65° C. When an electric current is applied consecutively to the first sacrificial anode and to the second sacrificial anode, the temperature of the reaction solution may be varied. For example, one reaction solution temperature may be used when applying electric current to the first sacrificial anode and another reaction solution temperature may be used when applying electric current to the second sacrificial anode.

The time of application of an electric current may vary from about 0.5 minutes to about 64,800 minutes. Furthermore, the time of application of an electric current may vary for the first sacrificial anode and for the second sacrificial anode. For example, an electric current may be applied to the first sacrificial anode and to the cathode for one time period while an electric current may be applied to the second sacrificial anode and to the cathode for a different time period.

The applied electric current may have a voltage from about 0.28 V to about 50 V and a current from about 0.25 mA to about 30 mA. Furthermore, the parameters of the applied electric current may vary for the first sacrificial anode and for the second sacrificial anode. For example, an electric current may be applied to the first sacrificial anode and to the cathode at one voltage while an electric current may be applied to the second sacrificial anode and to the cathode at a different voltage.

The reaction solution may be stirred during some of the time or during the entire duration of the processes of the invention. For example, a magnetic or mechanical stirrer may be used to stir the reaction solution. Without stirring, the core nanoparticles or the composite nanoparticles formed in the reaction solution may adhere to the electrodes. The core nanoparticles or the composite nanoparticles may then be scraped off from the electrodes.

A novel advantage of the above described processes lies in the ability to control structural composition of the prepared composite nanoparticles. For example, when preparing composite nanoparticles having a core-shell structure, it is possible to control which element will make up the core (i.e., the core nanoparticle) of the composite nanoparticle and which element will make up the shell layer. Such control may be exercised by various means. When the first sacrificial anode and the second sacrificial anode are used consecutively, the electric current is initially applied to the first sacrificial anode and then later applied to the second sacrificial anode. In this process, the resulting composite nanoparticles will have the core nanoparticle composed of the same element as that of the first sacrificial anode and will have the shell layer composed of the same element as that of the second sacrificial anode.

Alternatively, control of which element will make up the core nanoparticle and which element will make up the shell layer may be exercised by adjusting reaction conditions, such as voltage and/or current applied to each sacrificial anode. The voltage and current may be controlled by using a dedicated potentiostat for each sacrificial anode. The voltage and/or current of each sacrificial anode may be controlled against a single cathode. When a single cathode is used, such cathode should be electrochemically inert/stable toward the materials of the sacrificial anodes and should preferentially have a higher surface area than each sacrificial anode. Alternatively, two cathodes may be used concurrently. Since the amount of ions produced from each sacrificial anode depends on the current density, the composition of the core-shell nanoparticles could be controlled by adjusting the potential/current applied across each sacrificial anode when two sacrificial anodes are used concurrently against a single cathode or optionally, against two cathodes. For example, applying a relatively large current/voltage across the first sacrificial anode and the cathode and a relatively small current/voltage across the second sacrificial anode and the cathode, results in composite core-shell nanoparticles having a core nanoparticle primarily composed of the element from the first sacrificial anode and having a shell layer composed primarily of the element of the second sacrificial anode. Conversely, applying a relatively large current/voltage across the second sacrificial anode and the cathode and a relatively small current/voltage across the first sacrificial anode and the cathode, results in composite core-shell nanoparticles having a core nanoparticle primarily composed of the element from the second sacrificial anode and having a shell layer composed primarily of the element of the first sacrificial anode.

Another advantage of the above described process lies in the ability to control size and stoichiometry of the composite nanoparticles by controlling process parameters. With respect to voltage, increased voltage results in relatively smaller size composite nanoparticles and decreased voltage results in relatively larger size composite nanoparticles. For example, when preparing composite nanoparticles with core-shell structure and when using a process that involves consecutively using the first sacrificial anode and the second sacrificial anode, application of a relatively higher voltage to the first sacrificial anode will result in a relatively smaller size core nanoparticles and application of a relatively higher voltage to the second sacrificial anode will result in relatively thinner shell layer. Using the same principle, application of a relatively lower voltage to the first sacrificial anode will result in a relatively larger size core nanoparticles and application of a relatively lower voltage to the second sacrificial anode will result in a relatively thicker shell layer.

Furthermore, use of a relatively higher concentration of the complexing ligand will result in a relatively smaller size of the composite nanoparticles. On the other hand, use of a relatively lower concentration of the complexing ligand will result in a relatively larger size of the composite nanoparticles. When preparing composite nanoparticles with core-shell structure, use of a relatively higher concentration of the complexing ligand will result in a relatively smaller size of the core nanoparticles. On the other hand, use of a relatively lower concentration of the complexing ligand will result in a relatively larger size of the core nanoparticles.

Use of a relatively higher concentration of the electrolyte will result in a relatively smaller size of the composite nanoparticles. On the other hand, use of a relatively lower concentration of the electrolyte will result in a relatively larger size of the composite nanoparticles. When preparing composite nanoparticles with core-shell structure, use of a relatively higher concentration of the electrolyte will result in a relatively smaller size of the core nanoparticles. On the other hand, use of a relatively lower concentration of the electrolyte will result in a relatively larger size of the core nanoparticles.

The choice of temperature of the reaction solution also influences the size of composite nanoparticles. Use of a relatively higher temperature results in a relatively larger size composite nanoparticles. On the other hand, use of a relatively lower temperature results in a relatively smaller size composite nanoparticles. When preparing composite nanoparticles with core-shell structure, use of a relatively higher temperature results in a relatively larger size of the core nanoparticles and use of a relatively lower temperature results in a relatively smaller size of the core nanoparticles.

With respect to the duration of application of electric current, applying an electric current for a relatively longer duration results in a relatively larger sized composite nanoparticles, provided availability of the electrolyte and the complexing ligand. On the other hand, a relatively shorter duration of the application of the electric current results in relatively smaller sized composite nanoparticles. For example, when preparing composite nanoparticles with core-shell structure and when using a process that involves consecutively using the first sacrificial anode and the second sacrificial anode, a relatively longer duration of the application of the electric current to the first sacrificial anode and the cathode will result in a relatively larger size core nanoparticles and a relatively longer duration of the application of the electric current to the second sacrificial anode and the cathode will result in relatively thicker shell layer. Using the same principle, a relatively shorter duration of the application of the electric current to the first sacrificial anode and the cathode will result in a relatively smaller sized core nanoparticles and a relatively shorter duration of the application of the electric current to the second sacrificial anode and the cathode will result in a relatively thinner shell layer.

For example, preparation of cobalt nanoparticles using cobalt anode with an electric current (1) for 18 hours with 0.1 M concentration of tetraoctylammonium bromide (TOAB) electrolyte and 20 mg/mL concentration of 2-[2-(dimethylamino)ethoxy]ethanol complexing ligand in tetrahydrofuran organic solvent results in formation of cobalt nanoparticles having a mean diameter size of about 2.5 nm to about 5.2 nm. Table I summarizes the average diameter (calculated by counting approximately 50 nanoparticles from a TEM micrograph) of Co nanoparticles produced under different conditions of applied current.

TABLE 1

Average size of Co nanoparticles produced electrochemically by applying different currents.

| Current I (mA) | Average Diameter (nm) |
|---|---|
| 2 | 5.2 |
| 3 | 4.0 |
| 4 | 3.2 |
| 5 | 2.5 |

In addition to size, varying the above described reaction parameters allows one to exercise control over the stoichiometric composition of the formed composite nanoparticles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1

Synthesis of Co Nanoparticles

In an electrochemical cell (40 mL), fitted with Co electrodes (5 mm diameter×50 mm length) as both cathode and anode, either constant current or constant voltage experiments were performed for 8 h using a potentiostat. The distance between the electrodes was about 5 mm. The electrolysis was carried out in THF with 0.1 M TOAB as the supporting electrolyte and the solution was stirred vigorously using a magnetic stirrer during the reaction period. The solution turned dark yellow over the reaction period during which the voltage stabilized to 3 V. The reaction was performed under inert atmospheres inside a glovebox. The electrolysis was carried out at various currents from 0.25 mA up to 5 mA.

Example 2

Synthesis of Sm Nanoparticles

In an electrochemical cell (40 mL), fitted with Sm electrode (6.5 mm diameter×50 mm length) as anode and Pt (30 mm×30 mm) as cathode, 10 V current was passed for 8 h using a potentiostat. The distance between the electrodes was about 5 mm. The electrolysis was carried out in THF with 0.05 M TOAB as the supporting electrolyte and 0.5 mL 2-[2-(dimethylamino)ethoxy]ethanol as the ligand. The solution turned dark over the reaction period and was left under stirring overnight. Over the course of time, most of the nanoparticles formed got deposited at the samarium anode, which was scrapped off to collect the nanoparticles. All these steps were performed under inert atmospheres inside a glovebox.

Example 3

Synthesis of $SmCo_5$ Composite Nanoparticles

SmCo5 composite nanoparticles were synthesized using a two-step electrolysis method in a glovebox under inert atmosphere. In the first step, two Co electrodes (5 mm diameter 50 mm length) were used as anode and cathode in an electrochemical cell of 40 ml volume. The electrolyte solution had a working volume of 30 ml which comprised of 0.1 M TOAB as the supporting electrolyte in THF. To this electrolyte solution 2-[2-(Dimethylamino)ethoxy]ethanol (0.5 mL) was added as a complexing ligand that binds to both Samarium and Cobalt surfaces. The solution was stirred using a magnetic stirrer and electrolysis was carried out at 10 V using a Versastat potentiostat for 18 hours. The solution turned dark during the reaction period. After 18 hours, the Co anode was swapped with a Sm electrode (6.5 mm diameter×50 mm length) for the second step. In the second step, electrolysis was carried out at 8 V for 2 hours under the same conditions as the first step. The reaction solution was then washed 3 times with anhydrous ethanol with sufficient time for precipitation between each wash. The solution was then centrifuged to collect the nanoparticles, which was dried under reduced pressure to yield the $SmCo_5$ composite nanoparticles. A salt matrix annealing process was performed on the resultant black powder. The dried powders were mixed with anhydrous KCl in a stainless steel boat and heat treatment was performed in the presence of metallic Ca with forming gas (4% $H_2$+Ar). The annealing process was carried out at 960° C. for 2 hours in a tube furnace followed by quenching when the furnace temperature reached 500° C. The cooled powders were then washed to remove excess Ca and dried in a glovebox for further characterization.

Example 4

Characterization of $SmCo_5$ Nanoparticles

The synthesized $SmCo_5$ nanoparticles of the above Example 3 were characterized using TEM (Transmission Electron Microscopy and EDS (Energy Dispersive Spectroscopy). The TEM image of the nanoparticles was analyzed using a FEI Tecnai 200 kV system fitted with a Thermo Scientific EDS system. EDS pattern of the synthesized nanoparticles was used to determine the elemental composition of the composite nanoparticles. The spot EDS was performed under convergent beam mode.

The mean diameter size of the SmCo nanoparticles from the high resolution TEM analysis was determined to be about 5 nm. The EDS spectral peaks analysis showed that the SmCo nanoparticles have an atomic composition of 14:86 for Sm:Co, which is indicative of a 1:5 stoichiometric ratio of Sm:Co.

While only certain features of the invention have been illustrated and described herein, many modifications and changes will occur to those skilled in the art. It is, therefore, to be understood that the appended claims are intended to cover all such modifications and changes as failing within the true spirit of the invention.

Throughout this application, various references are referred to. The disclosures of these publications in their entireties are hereby incorporated by reference as if written herein.

What is claimed is:

1. A composite nanoparticle comprising a metal, a rare earth element, and a complexing ligand of formula (I):

(I)

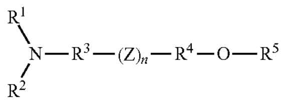

wherein $R^1$ is H, alkyl, arylalkyl, or aryl;

$R^2$ is H, alkyl, arylalkyl, or aryl;

$R^3$ is alkylene, -alkylene-arylene-, arylene, or alkylene substituted with alkyl or aryl;

$R^4$ is alkylene, -alkylene-arylene-, arylene, or alkylene substituted with alkyl or aryl;

$R^5$ is H, alkyl, arylalkyl, or aryl;

Z is —O—, —S—, —N(H)—, or —N($R^6$)—, wherein $R^6$ is alkyl; and n is 0 or 1.

2. The composite nanoparticle of claim 1, wherein the metal is a transition metal or a post-transition metal.

3. The composite nanoparticle of claim 1, wherein the metal is selected from the group consisting of iron, cobalt, nickel, manganese, platinum, aluminum, copper, zirconium, and chromium.

4. The composite nanoparticle of claim 1, wherein the rare earth element is selected from the group consisting of samarium, praseodymium, neodymium, gadolinium, yttrium, dysprosium, and terbium.

5. The composite nanoparticle of claim 1, wherein the metal is cobalt and the rare earth element is samarium.

6. The composite nanoparticle of claim 1, wherein the rare earth to the metal element stoichiometric ratio in the composite nanoparticle is selected from the group consisting of 1:1, 1:3, 1:5, 1:7, 1:13, 2:7, 2:17, and 5:19.

7. The composite nanoparticle of claim 1, wherein the complexing ligand is selected from the group consisting of 2-[2-(dimethylamino)ethoxy]ethanol, 2-[2-(diethylamino)ethoxy]ethanol, 2-{[2-(dimethylamino)ethyl]methylamino}ethanol, and 4-(dimethylamino)-1-butanol.

8. The composite nanoparticle of claim 1 having a mean diameter size from about 2 nm to about 500 nm.

9. The composite nanoparticle of claim 1 having an aspect ratio from 1 to 1000.

* * * * *